(No Model.)
T. SYMONDS.
TUBULAR DRILL FOR SUBMARINE WORK.
No. 580,351. Patented Apr. 6, 1897.
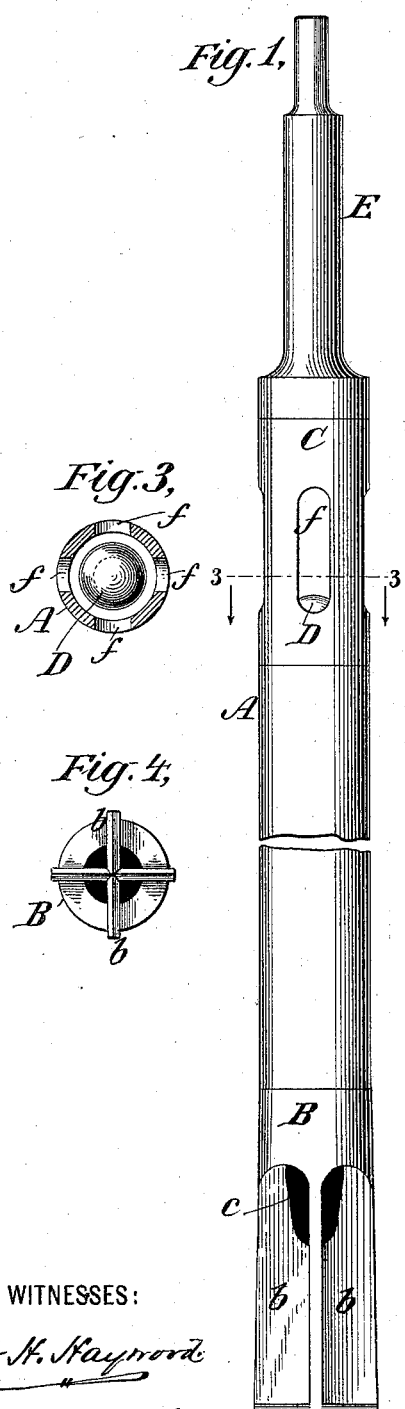
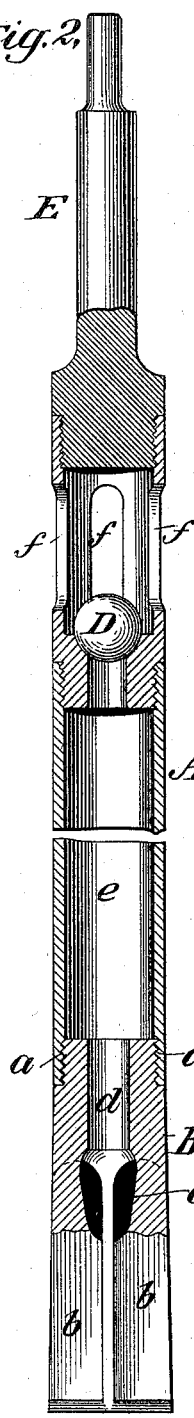
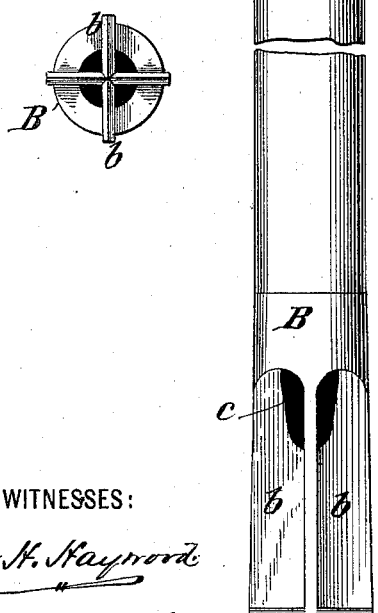
WITNESSES:
INVENTOR
Thomas Symonds
BY
his ATTORNEYS.

UNITED STATES PATENT OFFICE.

THOMAS SYMONDS, OF LEOMINSTER, MASSACHUSETTS, ASSIGNOR OF ONE-HALF TO P. SANFORD ROSS, OF JERSEY CITY, NEW JERSEY; ARTHUR H. FOLGER ADMINISTRATOR OF SAID SYMONDS, DECEASED.

TUBULAR DRILL FOR SUBMARINE WORK.

SPECIFICATION forming part of Letters Patent No. 580,351, dated April 6, 1897.

Application filed March 17, 1896. Serial No. 583,590. (No model.)

*To all whom it may concern:*

Be it known that I, THOMAS SYMONDS, a citizen of the United States, and a resident of Leominster, Massachusetts, have invented an Improved Tubular Drill for Submarine Work, of which the following is a specification.

My invention consists of an improved self-cleaning drill designed for submarine work.

In the accompanying drawings, Figure 1 is a side elevation of my improved drill. Fig. 2 is a vertical section of the same. Fig. 3 is a transverse section on the line 3 3, Fig. 1; and Fig. 4 is a view of the cutting-face of the drill.

The tube A, of suitable size and material, has screwed to its end at $a$ the drill-bit B, which has a number of radial cutting-wings $b$. From the meeting edges of these wings at some distance back from the cutting-faces, are inlet-openings $c$, leading to the common internal passage $d$, which opens into the main channel $e$ of the tube.

A cage containing a ball-valve D is secured to the upper end of the tube A at some distance above the drill-point, and this cage has large outlet-openings $f$ in its side just above the valve-seat to form an unobstructed passage for the discharge of the detritus, &c. By thus arranging the ball-valve and its cage at a considerable distance above the drill-point and providing said cage with large openings the entire area of the tube from the valve-seat to the inlet-openings in the drill-point can be employed to allow the detritus to pass up the tube and escape through the openings, so the valve can be raised to the upper end of the cage, thereby preventing any possibility of clogging or choking up the tube. Above this is the stem E of the drill, to which the lengths of the drill-rod may be clamped in the ordinary way.

In use a more or less rapid reciprocating motion up and down is imparted to the drill, which is also intermittently rotated. As the drill descends the detritus, &c., will pass in through the openings $c$ and up through the passages $d$ $e$ and past the valve D, which is lifted from its seat in the descent of the drill. The material can thence pass out freely through the large outlet-openings $f$ just above the valve-seat. As the drill is raised again the valve D closes to its seat and the detritus which has passed it is forced upward.

I am aware that tubular-valved drills to trap and carry off detritus are not new. This I do not claim, broadly; but

I claim as my invention—

The self-clearing submarine drill herein described, consisting of a tube, having a drill-point with cutting-wings at its lower end, and inlet-orifices, connecting with the main channel of the tube in combination with a ball-valve placed in a cage, provided with large outlet-openings beginning just above the valve-seat, and arranged at some distance above the drill-point, and forming an unobstructed passage for the detritus, as shown and specified.

In testimony whereof I have signed my name to this specification in the presence of two subscribing witnesses.

THOMAS SYMONDS.

Witnesses:
EDWARD A. MAGEE,
FRANK E. FISHER.